US010592924B1

(12) United States Patent
Cronin

(10) Patent No.: US 10,592,924 B1
(45) Date of Patent: Mar. 17, 2020

(54) MANAGING THIRD PARTY INTERACTIONS WITH VENUE COMMUNICATIONS

(71) Applicant: ProSports Technologies, LLC, Miami, FL (US)

(72) Inventor: John Cronin, Bonita Springs, FL (US)

(73) Assignee: ProSports Technologies, LLC, Miami, FL (US)

(*) Notice: Subject to any disclaimer, the term of this patent is extended or adjusted under 35 U.S.C. 154(b) by 486 days.

(21) Appl. No.: 14/732,363

(22) Filed: Jun. 5, 2015

Related U.S. Application Data

(60) Provisional application No. 62/008,487, filed on Jun. 5, 2014, provisional application No. 62/008,498, filed on Jun. 5, 2014, provisional application No. 62/008,499, filed on Jun. 5, 2014.

(51) Int. Cl.
*G06Q 30/02* (2012.01)
*H04L 12/717* (2013.01)

(52) U.S. Cl.
CPC ......... *G06Q 30/0252* (2013.01); *H04L 45/42* (2013.01)

(58) Field of Classification Search
None
See application file for complete search history.

(56) References Cited

U.S. PATENT DOCUMENTS

| 5,754,636 | A | 5/1998 | Bayless et al. |
|---|---|---|---|
| 6,824,480 | B2 | 11/2004 | John et al. |
| 7,583,901 | B2 | 9/2009 | Nakagawa et al. |
| 7,715,723 | B2 | 5/2010 | Kagawa et al. |
| 7,899,159 | B1 | 3/2011 | Croak et al. |
| 8,027,451 | B2 | 9/2011 | Arendsen et al. |
| 8,175,913 | B2 | 5/2012 | Checketts et al. |
| 8,188,878 | B2 | 5/2012 | Pederson et al. |
| 8,540,583 | B2 | 9/2013 | Leech |
| 8,565,607 | B2 | 10/2013 | Kang et al. |
| 8,589,667 | B2 | 11/2013 | Mujtaba et al. |

(Continued)

FOREIGN PATENT DOCUMENTS

| CN | 1741548 | 3/2006 |
|---|---|---|
| CN | 101815100 | 8/2010 |

(Continued)

OTHER PUBLICATIONS

Lichtenthal et al. Outdoor advertising for business markets. Feb. 2006, Science Direct, vol. 35, Issue 2. pp. 236-247. (Year: 2006).*

(Continued)

*Primary Examiner* — William A Brandenburg
*Assistant Examiner* — Christopher C Busch
(74) *Attorney, Agent, or Firm* — Polsinelli LLP

(57) ABSTRACT

Systems and methods for managing third party interactions with event venue communications are provided. Incoming communications may be received from a third party device and stored in a database. Each communication may be associated with one or more parameters. When the parameters associated with a specified communication are determined to have been met, one or more targets are identified for the specified communication. Such identified targets may be associated with a particular communications hub that may be provided with the specified communication to direct to the identified targets.

19 Claims, 11 Drawing Sheets

(56) References Cited

U.S. PATENT DOCUMENTS

| | | | |
|---|---|---|---|
| 8,611,930 B2 | 12/2013 | Louboutin et al. | |
| 8,620,344 B2 | 12/2013 | Huang et al. | |
| 8,626,465 B2 | 1/2014 | Moore et al. | |
| 8,630,216 B2 | 1/2014 | Deivasigamani et al. | |
| 8,660,501 B2 | 2/2014 | Sanguinetti | |
| 8,687,965 B2 | 4/2014 | Pederson et al. | |
| 8,706,044 B2 | 4/2014 | Chang et al. | |
| 8,724,723 B2 | 5/2014 | Panicker et al. | |
| 8,750,207 B2 | 6/2014 | Jeong et al. | |
| 8,793,094 B2 | 7/2014 | Tam et al. | |
| 8,816,868 B2 | 8/2014 | Tan et al. | |
| 8,831,529 B2 | 9/2014 | Toh et al. | |
| 8,831,655 B2 | 9/2014 | Burchill et al. | |
| 8,836,851 B2 | 9/2014 | Brunner | |
| 8,843,158 B2 | 9/2014 | Nagaraj | |
| 8,849,308 B2 | 9/2014 | Marti et al. | |
| 8,862,060 B2 | 10/2014 | Mayor | |
| 8,873,418 B2 | 10/2014 | Robinson et al. | |
| 8,874,090 B2 | 10/2014 | Abuan et al. | |
| 8,917,632 B2 | 12/2014 | Zhou et al. | |
| 8,934,921 B2 | 1/2015 | Marti et al. | |
| 9,635,506 B1 | 4/2017 | Cronin | |
| 9,648,218 B2* | 5/2017 | Zhang | H04N 5/23222 |
| 9,648,452 B1 | 5/2017 | Cronin | |
| 9,742,894 B2 | 8/2017 | Cronin | |
| 2007/0022445 A1 | 1/2007 | Areseneau | |
| 2007/0055982 A1 | 3/2007 | Spilo | |
| 2007/0140176 A1 | 6/2007 | Bachenberg | |
| 2008/0154723 A1* | 6/2008 | Ferguson | G06Q 30/02 705/14.54 |
| 2009/0036205 A1 | 2/2009 | Seacal et al. | |
| 2009/0310971 A1 | 12/2009 | Kim et al. | |
| 2010/0082980 A1 | 4/2010 | Shiraki | |
| 2010/0283630 A1 | 11/2010 | Alonso | |
| 2010/0289644 A1 | 11/2010 | Slavin et al. | |
| 2011/0055862 A1 | 3/2011 | Harp et al. | |
| 2011/0294547 A1 | 12/2011 | Ni | |
| 2011/0306326 A1 | 12/2011 | Reed et al. | |
| 2012/0078667 A1 | 3/2012 | Denker et al. | |
| 2012/0086549 A1* | 4/2012 | Barnes, Jr. | G06Q 10/1053 340/5.61 |
| 2012/0158995 A1 | 6/2012 | McNamee et al. | |
| 2012/0314797 A1 | 12/2012 | Kummetz et al. | |
| 2013/0126713 A1 | 5/2013 | Haas et al. | |
| 2013/0141555 A1 | 6/2013 | Ganick et al. | |
| 2013/0208184 A1 | 8/2013 | Castor et al. | |
| 2013/0217332 A1 | 8/2013 | Altman et al. | |
| 2013/0217333 A1* | 8/2013 | Sprigg | G06Q 30/0207 455/41.2 |
| 2013/0262163 A1 | 10/2013 | Bergdale et al. | |
| 2013/0279017 A1 | 10/2013 | Son et al. | |
| 2013/0303192 A1 | 11/2013 | Louboutin | |
| 2013/0304651 A1* | 11/2013 | Smith | G06Q 20/3227 705/67 |
| 2013/0317835 A1 | 11/2013 | Mathew | |
| 2013/0317916 A1 | 11/2013 | Gopalakrishnan et al. | |
| 2013/0328917 A1 | 12/2013 | Zhou | |
| 2013/0330088 A1 | 12/2013 | Oshima et al. | |
| 2013/0331087 A1 | 12/2013 | Shoemaker | |
| 2013/0331118 A1 | 12/2013 | Chhabra | |
| 2013/0331137 A1 | 12/2013 | Burchill | |
| 2013/0332108 A1 | 12/2013 | Patel | |
| 2013/0332156 A1 | 12/2013 | Tackin | |
| 2013/0336222 A1 | 12/2013 | Lu et al. | |
| 2013/0336662 A1 | 12/2013 | Murayama et al. | |
| 2013/0337787 A1 | 12/2013 | Yamada et al. | |
| 2013/0343762 A1 | 12/2013 | Murayama et al. | |
| 2014/0037296 A1 | 2/2014 | Yamada et al. | |
| 2014/0062773 A1 | 3/2014 | MacGougan | |
| 2014/0065962 A1 | 3/2014 | Le | |
| 2014/0071221 A1 | 3/2014 | Dave | |
| 2014/0098241 A1 | 4/2014 | Stout et al. | |
| 2014/0105084 A1 | 4/2014 | Chhabra | |
| 2014/0139380 A1 | 5/2014 | Ouyang | |
| 2014/0141803 A1 | 5/2014 | Marti | |
| 2014/0162628 A1 | 6/2014 | Bevelacqua | |
| 2014/0167794 A1 | 6/2014 | Nath | |
| 2014/0168170 A1 | 6/2014 | Lazarescu | |
| 2014/0171114 A1 | 6/2014 | Marti | |
| 2014/0173692 A1 | 6/2014 | Srinivasan | |
| 2014/0180820 A1 | 6/2014 | Louboutin | |
| 2014/0191979 A1 | 7/2014 | Tsudik | |
| 2014/0200053 A1 | 7/2014 | Balasubramanian | |
| 2014/0222335 A1 | 8/2014 | Piemonte | |
| 2014/0232633 A1 | 8/2014 | Shultz | |
| 2014/0232634 A1 | 8/2014 | Piemonte | |
| 2014/0241730 A1 | 8/2014 | Jovicic et al. | |
| 2014/0247279 A1 | 9/2014 | Nicholas | |
| 2014/0247280 A1 | 9/2014 | Nicholas | |
| 2014/0256478 A1 | 9/2014 | Gale | |
| 2014/0269562 A1 | 9/2014 | Burchill | |
| 2014/0274150 A1 | 9/2014 | Marti | |
| 2014/0283135 A1 | 9/2014 | Shepherd | |
| 2014/0293959 A1 | 10/2014 | Singh | |
| 2014/0357226 A1 | 12/2014 | Charugundla | |
| 2014/0363168 A1 | 12/2014 | Walker | |
| 2014/0364089 A1 | 12/2014 | Lienhart | |
| 2014/0364148 A1 | 12/2014 | Block | |
| 2014/0365120 A1 | 12/2014 | Vulcano | |
| 2014/0375217 A1 | 12/2014 | Feri et al. | |
| 2015/0011242 A1 | 1/2015 | Nagaraj | |
| 2015/0026623 A1 | 1/2015 | Horne | |
| 2015/0031397 A1 | 1/2015 | Jouaux | |
| 2016/0057610 A1 | 2/2016 | Cronin | |
| 2016/0189214 A1* | 6/2016 | Dai | G06Q 30/0255 705/14.53 |

FOREIGN PATENT DOCUMENTS

| | | |
|---|---|---|
| CN | 102273323 | 12/2011 |
| CN | 102843186 | 12/2012 |
| CN | 202857947 | 4/2013 |
| CN | 103297888 | 9/2013 |
| CN | 103490812 | 1/2014 |
| EP | 2 549 442 | 1/2013 |
| KR | 10 2013-0116417 | 10/2013 |
| WO | WO 2009/104921 | 8/2009 |
| WO | WO 2013/070271 | 5/2013 |
| WO | WO 2013/109934 | 7/2013 |
| WO | WO 2014/085694 | 6/2014 |
| WO | WO 2016/032714 | 3/2016 |

OTHER PUBLICATIONS

U.S. Appl. No. 14/731,901 Office Action dated Oct. 24, 2016.
U.S. Appl. No. 14/819,386, Office Action dated Aug. 5, 2016.
U.S. Appl. No. 14/731,901 Final Office Action dated May 30, 2017.
PCT/US15/43882, Disposable Connectable Wireless Communication Receiver, Aug. 5, 2015.
U.S. Appl. No. 14/732,533, John Cronin, Wireless Communication Driven by Object Tracking, filed Jun. 5, 2015.
U.S. Appl. No. 14/732,400, John Cronin, Zone Based Wireless Player Communications, filed Jun. 5, 2015.
U.S. Appl. No. 14/731,901, John Cronin, Managing Smart Tickets, filed Jun. 5, 2015.
U.S. Appl. No. 14/819,386, John Cronin, Disposable Connectable Wireless Communication Receiver, filed Aug. 5, 2015.
U.S. Appl. No. 14/732,553, Final Office Action dated Nov. 16, 2016.
U.S. Appl. No. 14/732,400, Final Office Action, dated Oct. 31, 2016.
U.S. Appl. No. 14/732,553, Office Action dated May 9, 2016.
U.S. Appl. No. 14/732,400, Office Action dated May 10, 2016.
U.S. Appl. No. 14/819,386, Final Office Action dated Mar. 24, 2016.
U.S. Appl. No. 14/731,901 Office Action dated Nov. 29, 2017.
About ByteLight, Date of Download: Jul. 18, 2014, www.bytelight.com/about.
"Create Innovative SERVICES with PLAY APPs", Date of Download: Jan. 16, 2014, http://www.oledcomm.com/LIFI.html, Oledcomm—France LiFi.
Danakis, C et al.; "Using a CMOS Camera Sensor for Visible Light Communication"; 3rd IEEE Workshop on Optical Wireless Communications; [online], Dec. 3-7, 2012 [retrieved Aug. 14, 2015].

(56) References Cited

OTHER PUBLICATIONS

Retrieved from the Internet: <URL: https://195.134.65.236/IEEE_Globecom_2010/papers/p1244-danakis.pdf> pp. 1244-1248.
Dawson, Keith; "LiFi in the Real World" All LED Lighting—Illuminating the LED Community, Jul. 31, 2013.
Gorman, Michael; "Outstanding Technology brings visible light communication to phones and tablets via dongle and LEDs", Edgadget International Editions, Jul. 16, 2012.
Haas, Harald; "Delivering safe and secure wireless communications", pureLiFi. Date of download: Jan. 16, 2014 http://purelifi.co.uk/.
Hao et al., Tian; "COBRA: Color Barcode Streaming for Smartphone Systems", MobiSys '12 Proceedings of the 10th International conference on Mobile systems, applications, and Services. pp. 85-98, Jun. 25, 2012.
Haruyama, Shinichiro; "Visible Light Communications: Recent Activities in Japan", Smart Spaces: A Smart Lighting ERC Industry-Academia Day at BU Photonics Center, Boston University. Feb. 8, 2011.
Komine, Toshihiko; Nakagawa, Masao; "Integrated System of White LED Visible-Light Communication Power-Line Communication", Dept. of Information and Computer Science, Keio University. Feb. 2003.
Kumar, Navin; "Visible Light Communications Systems Conception and VIDAS", IETE Technical Review, vol. 25, Issue 6, Nov.-Dec. 2008. Date of download: Nov. 19, 2009. http://www.tr.ietejournals.org.
LiFi Overview—Green wireless mobile communication—LiFi Technology. Date of download: Jan. 16, 2014.
Li, Yang et al., "VICO: A Framework for Configuring Indoor Visible Light Communication Networks" Aug. 11, 2012, Mobile Adhoc and Sensor Systems (MASS), 2012 IEEE 9th International Conference, Las Vegas, NV.
Little, Thomas; "Exploding Interest in Visible Light Communications: An Applications Viewpoint", Smart Light Annual Industry-Academia Days, Feb. 13-15, 2012.
Montero, Eric, "Design and Implementation of Color-Shift Keying for Visible Light Communications", Sep. 2013, McMaster University.
Nguyen et al., "A Novel like switching scheme using pre-scanning and RSS prediction in visible light communication networks", EURASIP Journal on Wireless Communications and Networking, 2013.
Ogawa; "Article about VLC Guidance developed", Visible Light Communications Consotium (VLCC), Aug. 31, 2012.
Ogawa; "iPhone app from CASIO", Visible Light Communications Consotium (VLCC), Apr. 26, 2012.
Pacchloll, David; "Optical wireless may be the answer to dropped calls, and more", PennState University, Oct. 2, 2013.
Povey, Gordon, "VLC for Location, positioning and navigation", Jul. 27, 2011, http://visiblelightcomm.com/vlc-for-location-positioning-and-n . . . .
Spaarmann, Stefan; "Opportunities for a Sustainable Communications Technology". 2009.
Thanigavel, M.; "Li-Fi Technology in Wireless Communication", International Journal of Engineering Research & Technology (IJERT), ISSN: 2278-0181, vol. 2 Issue 10, Oct. 2013.
"Visible Light Communication", HWCommunications . . . Creating the next generation of solutions. Date of Download: Aug. 10, 2014. http://cyber.hwcomms.com/cyber/VLC.
"Visible Light Communication for Mobile Phones.mp4", YOUTUBE, Apr. 26, 2012.
Won, Eun Tae; "Visible Light Communication: Tutorial", Project: IEEE P802.15 Working Group for Wireless Personal Area Networks (WPANs), Mar. 9, 2008.
Zhang et al., Weizhi; "Asynchronous indoor positioning system based on visible light communications", Optical Engineering 53(4), 045105 (Apr. 2014).
PCT Application No. PCT/US2015/033613 International Search Report and Written Opinion dated Sep. 1, 2015.
PCT Application No. PCT/US2015/043882 International Search Report and Written Opinion dated Oct. 28, 2015.
U.S. Appl. No. 14/819,386 Office Action dated Sep. 24, 2015.

\* cited by examiner

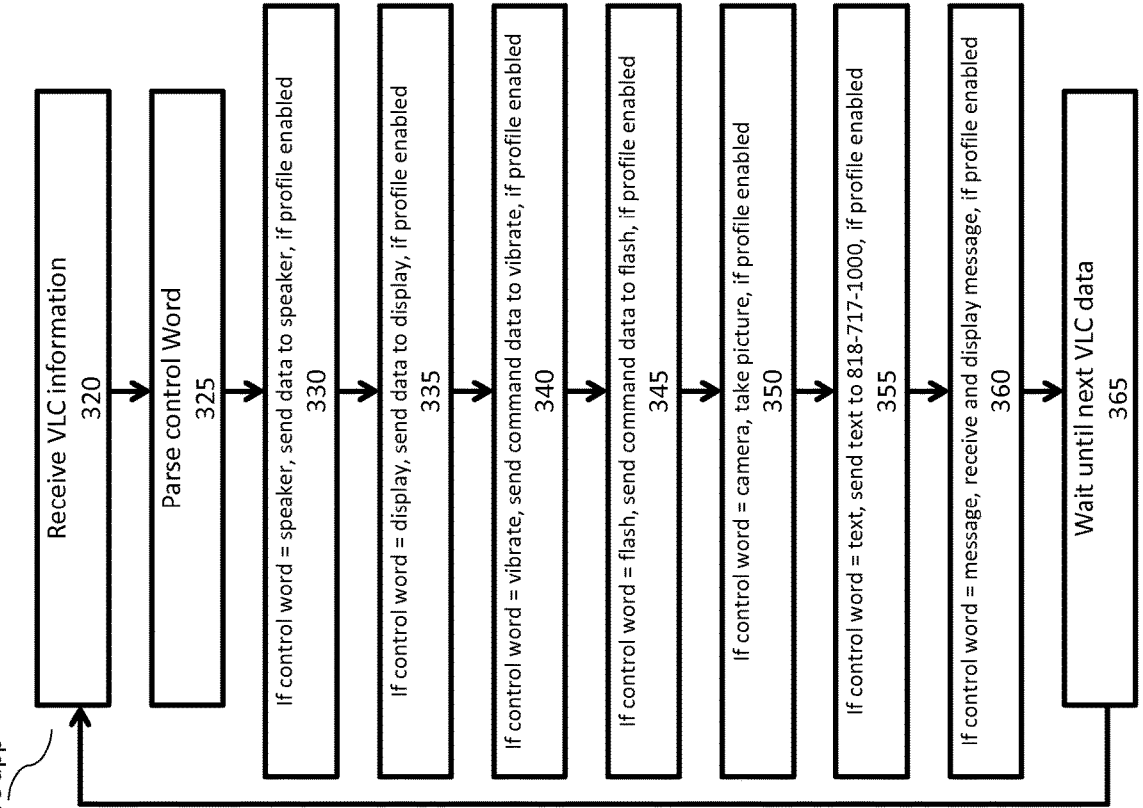
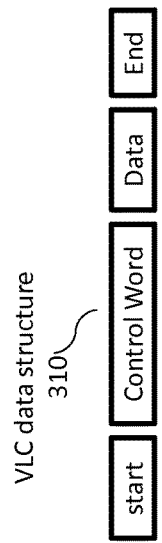

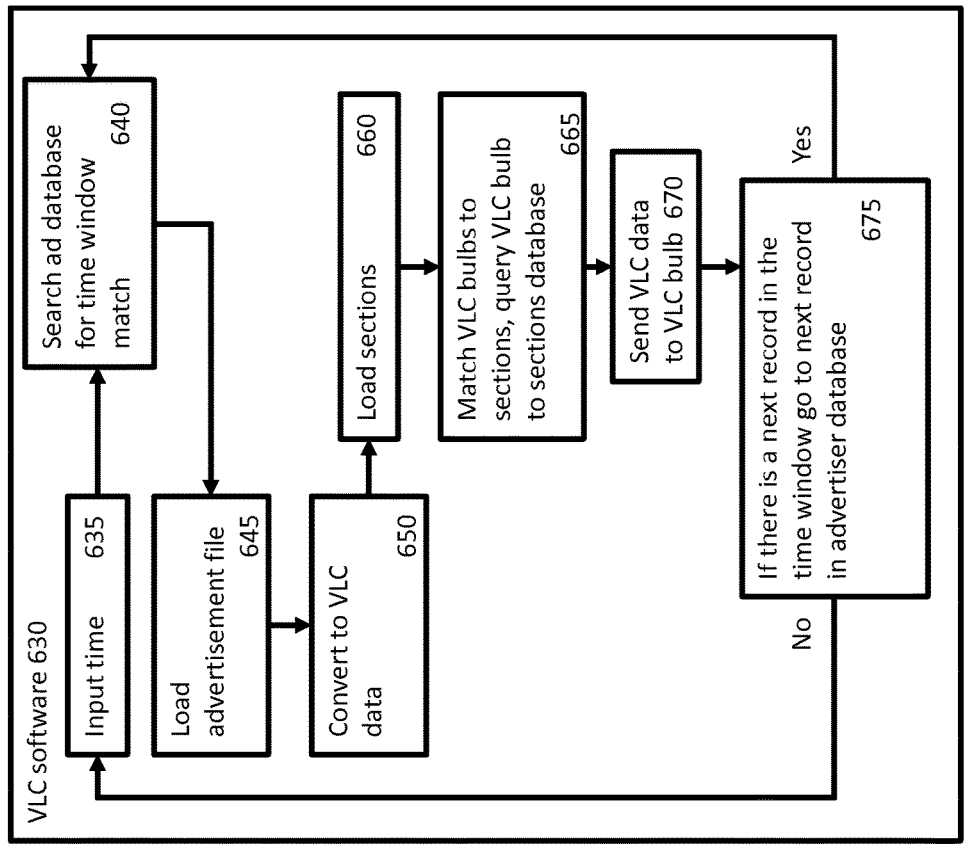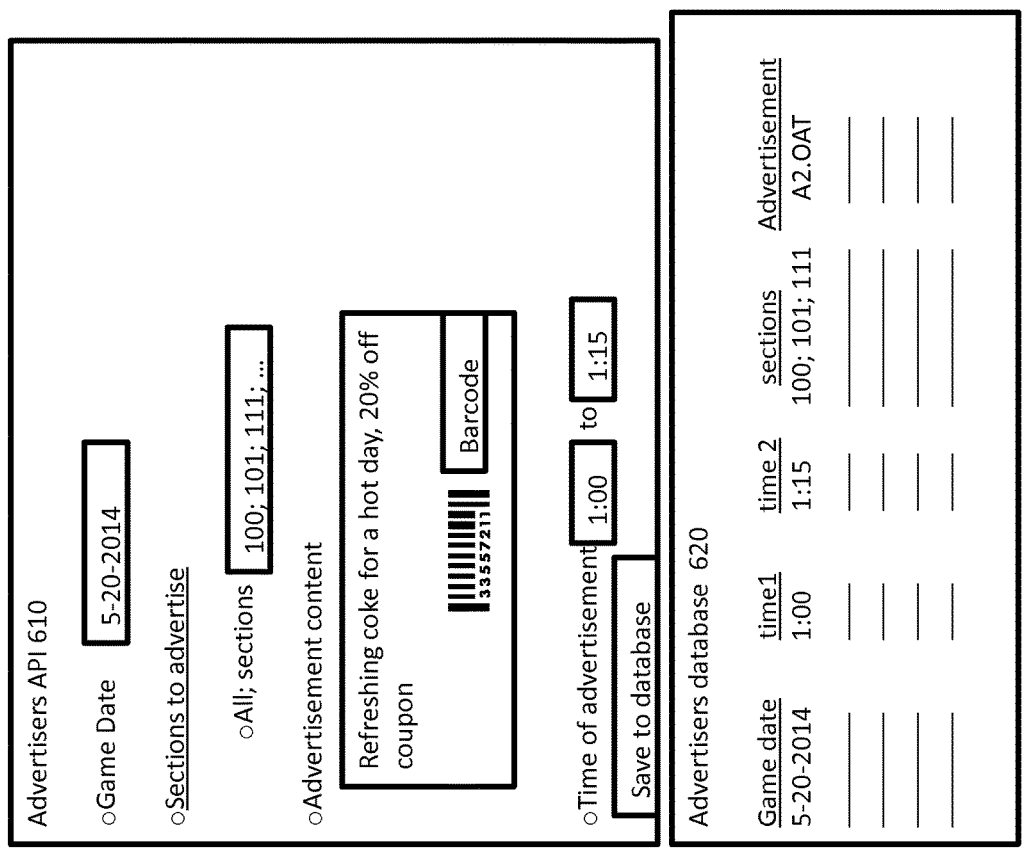
FIGURE 6

MANAGING THIRD PARTY INTERACTIONS WITH VENUE COMMUNICATIONS

CROSS-REFERENCE TO RELATED APPLICATIONS

The present patent application claims the priority benefit of U.S. provisional patent application 62/008,487 filed Jun. 5, 2014 and titled "VLC Drives Functions to Enhance Fan Experience," U.S. provisional patent application 62/008,498 filed Jun. 5, 2014 and titled "Advertisers Control of VLC System," and U.S. provisional patent application 62/008,499, filed Jun. 5, 2014 and titled "Announcers VLC System," the disclosures of which are incorporated by reference herein.

BACKGROUND OF THE INVENTION

1. Field of the Invention

The present invention generally relates to venue communications. More specifically, the present invention relates to managing third party interactions with venue communications.

2. Description of the Related Art

An event venue may be inclusive any type of facility that may be used for entertainment or cultural events. Such events may be presented at a theater, gymnasium, stadium, or other facility to a group of people. Such events include a wide variety of sporting events such as football (American and global), baseball, basketball, soccer, ice hockey, lacrosse, rugby, cricket, tennis, track and field, golf, cycling, motor sports such as automobile or motorcycle racing, horse racing, Olympic competitions; cultural events such as concerts, music festivals, plays, or the opera; religious events; and more permanent exhibitions such as a museum or historically significant buildings or monuments.

An individual attending an event at a particular event venue may be assigned to a particular section of the venue, a row number, a seat number, and other information. While at the event, the attendee may engage in a variety of activities, including participating in fan activities, buying souvenirs, and availing themselves of various event-related services. There is presently no way, however, to communicate information to such attendees on an individual or seat-specific (or row-specific or section-specific) basis.

Visual light communications (VLC) are an emerging form of communications that use line-of-sight visual forms of light emitters to communicate data wirelessly. VLC may use a light source that is frequency modulated or that is turned on and off rapidly when transmitting a communication. In either instance, the technology enables the use of a visible light to communicate a message by manipulating the light source. Likewise, there are a variety of other wireless communications systems (e.g., cellular, Bluetooth, near field communications) that are known in the art for communicating with personal user devices belonging to attendees. VLC and other wireless communication methods may be used to communicate with a user device of the attendee, but there is presently no way to distinguish a particular attendee device or determine where the attendee device will be.

There is, therefore, a need in the art for improved systems and methods for managing third party interactions with venue communications.

SUMMARY OF THE CLAIMED INVENTION

Embodiments of the present invention may include systems and methods for managing third party interactions with event venue communications. Incoming communications may be received from a third party device and stored in a database. Each communication may be associated with one or more parameters. When the parameters associated with a specified communication are determined to have been met, one or more targets are identified for the specified communication. Such identified targets may be associated with a particular communications hub that may be provided with the specified communication to direct to the identified targets.

BRIEF DESCRIPTION OF THE DRAWINGS

FIG. 3A illustrates an exemplary software application profile that may be used in a system for managing third party interactions with venue communications.

FIG. 3B illustrates an exemplary data structure that may be used in a system for managing third party interactions with venue communications.

FIG. 3C is a flowchart illustrating an exemplary software application method that may be executed in a system for managing third party interactions with venue communications.

FIG. 6 illustrates an exemplary advertising system that may be used in a system for managing third party interactions with venue communications.

DETAILED DESCRIPTION

Embodiments of the present invention provide systems and methods for managing third party interactions with event venue communications are provided. Incoming communications may be received from a third party device and stored in a database. Each communication may be associated with one or more parameters. When the parameters associated with a specified communication are determined to have been met, one or more targets are identified for the specified communication. Such identified targets may be associated with a particular communications hub that may be provided with the specified communication to direct to the identified targets.

Figure 1A:
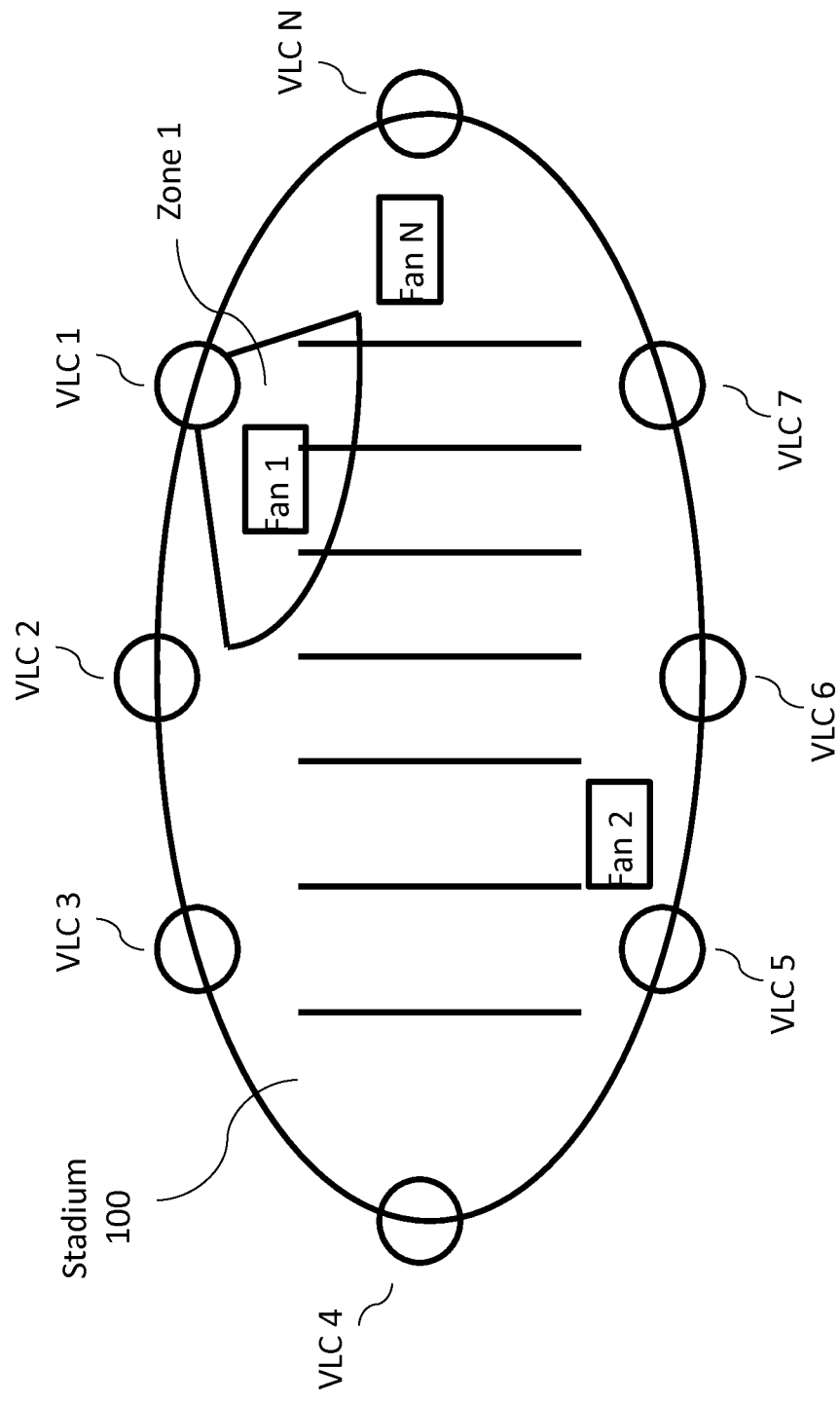
FIG. 1A illustrates a high-level view of an exemplary environment in which a system for managing third party interactions with venue communications may be implemented.

FIG. 1A illustrates an exemplary environment 100 in which a system for managing third party interactions with venue communications may be implemented. Such environment 100 may be any type of event venue, including the illustrated stadium, field, and section seating. As illustrated, the stadium environment 100 may include different wireless communication hubs (e.g., VLC bulbs 1-N) that may be specific to a particular section or sub-section of the event venue (e.g., VLC bulbs 1 is in Zone 1). Such communication hubs may be used, for example, to communicate wirelessly with an event attendee (or specifically, their user device) that is located in a particular section of the event venue. While the present disclosure may reference VLC and VLC-specific devices, such references are inclusive of other known wireless communications systems and corresponding devices.

Figure 1B:
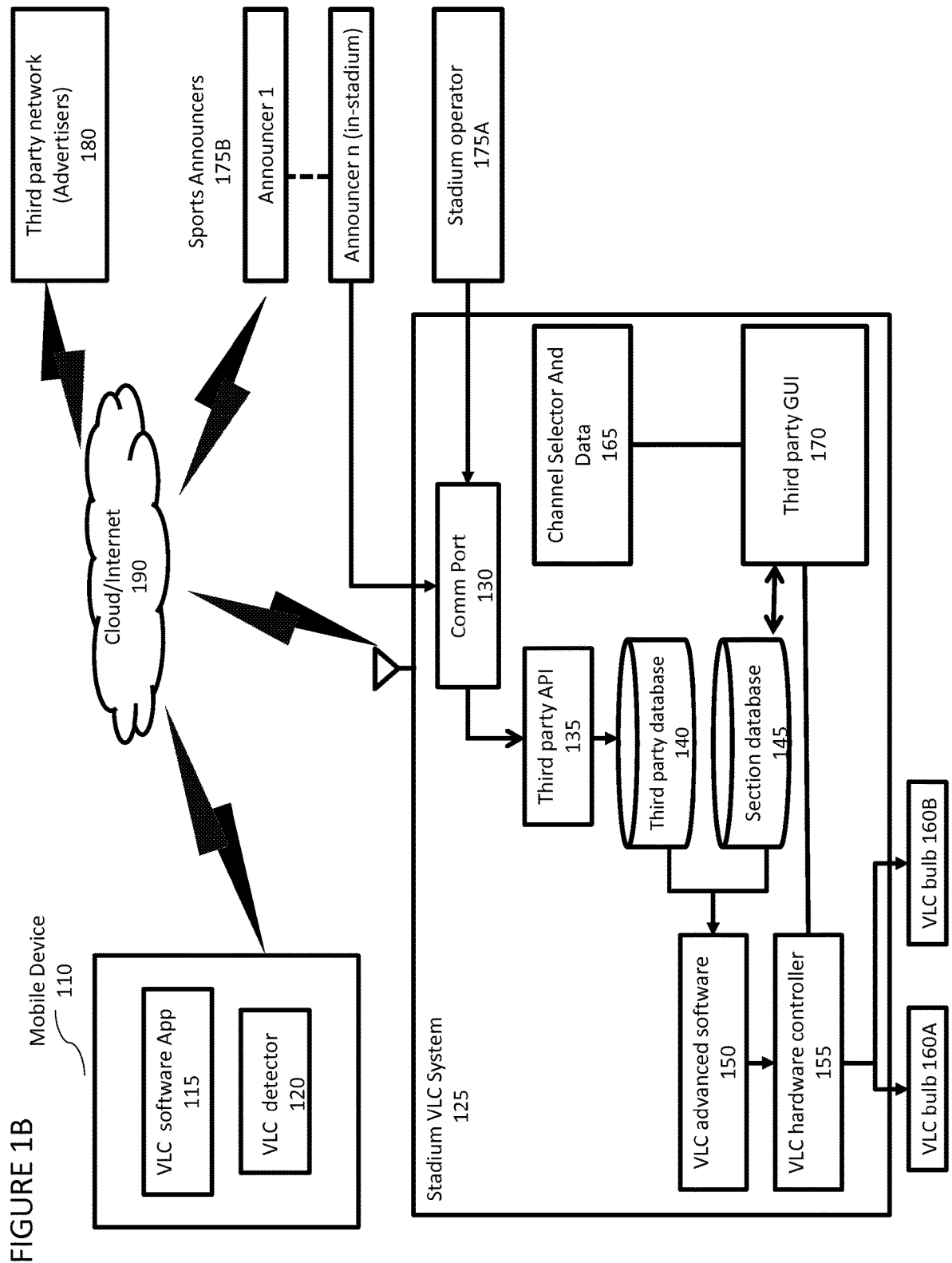
FIG. 1B illustrates an exemplary network environment in which a system for managing third party interactions with venue communications may be implemented.

FIG. 1B illustrates an exemplary network environment in which a system for managing third party interactions with venue communications may be implemented. Such a network environment may include a mobile device 110 having a software application 115 and VLC detector 120 (or other wireless interface); a stadium VLC system 125 having a communication port 130, advertiser API 135, advertiser database 140, section database 145, VLC advanced software 150, VLC hardware controller 155, and VLC bulbs 160A-B; in-stadium announcers 175A, other announcers 175B, and an advertisers network server 180, all of which may communicate wirelessly via the cloud or internet 190.

Users may use any number of different electronic user devices 110, such as mobile phones, smartphones, personal digital assistants (PDAs), portable computing devices (e.g., laptop, netbook, tablets), handheld computing device, wearable device, or any other type of computing device capable of communicating over a wireless communication network. User devices 110 may also be configured to access data from other storage media, such as memory cards or disk drives as may be appropriate in the case of downloaded services. User device 110 may include standard hardware computing components such as network and media interfaces, non-transitory computer-readable storage (memory), and processors for executing instructions that may be stored in memory.

Such user device 110 may include a VLC software application 115 and a VLC detector 120 (or other interface for communicating via the wireless communication system). VLC software application 115 may be used by the user of user device 110 to interact and manage various communications and transactions related to the event or event venue. VLC detector 120 (or other interface) may be any interface known in the art for receiving VLC (or other type of wireless) communications. When a VLC-based message (or other wireless communication) is received from a VLC bulb (or other communication hub), the VLC detector 120 may detect and provide the message to the VLC software application 115 for display and interaction by the user.

Stadium VLC system 125 controls the wireless communications sent (via VLC bulbs 160A-B) to the mobile device 110. Stadium VLC system 125 may receive communications from various sources and then push such communications out to a designated audience (e.g., individual or section of individuals) in accordance with one or more parameters. Such communications may come from various sources, including the venue administrators, advertisers, announcers, and others.

Communications port 130 may be capable of any form of device communication known in the art. Communications port 130 allows for stadium VLC system 125 to receive information from various sources. Such information may be further pushed out to one or more individuals in the event venue through the same or different communication channel in accordance with any applicable parameters associated with the information. For example, the information may be directed at an intended recipient (or group of recipients) in a particular section of the event venue.

Third parties may interact with the stadium VLC system 125 via a third party API 135. Such a third party API 135 may allow for third parties such as advertisers to log into stadium VLC system 125 and provide advertising to be delivered to event attendees. Such third party API 135 may further allow the advertiser to specify parameters concerning which event attendees to whom to deliver the advertising, as well as timing and frequency. For example, an advertiser may specify that an advertising campaign (one or more advertisements and associated materials) be conducted in a certain way where ad1 is sent to individuals in section 1 at the beginning of the event, ad2 is sent to individuals in section 2 twenty minutes later, and so forth. Likewise, other parties may use third party API to view and manage their communications.

Third party database 140 may be any type of memory or repository known in the art for storing content related to a third party (e.g., advertisers). For example, a third party advertiser may use third party database 140 to store advertising from one or more advertisers as received via third party API 135. When an advertising campaign is executed, the associated advertising and related materials may be stored in advertiser database 140. The related materials may include a variety of metadata and parameters associated with each advertisement or campaign.

Section database 145 may store information regarding which communication hubs (e.g., VLC bulbs 160A-B) are directed at which sections (or seats). Section database 145 may be accessed to determine which communication hub is directed at the individual or individuals that are the target or intended recipient of a particular communication. For example, a vendor located by section 1 may wish to send advertising or coupons to individuals in section 1. Section database 145 stores information identifying which communication hub (e.g., VLC bulb 160A) to use to communicate with individual(s) in a particular section or seat.

VLC advanced software 150 may access information stored in databases (e.g., advertiser database 140 and section database 145) to generate communications targeted at particular seats or sections. For example, VLC advanced software 150 may identify that an advertisement should be sent to individuals in a particular section, access that advertisement from advertiser database 140, determine that the associated parameters indicate that the advertisement should be sent to a particular section, access information from section database 145 to identify which communication hubs are directed at the particular section, and provide such information to VLC hardware controller 155.

VLC hardware controller 155 may be any type of controller over communication hubs (e.g., VLC bulbs 160A-B in FIG. 1). VLC hardware controller 155 may control the operation of the communication hubs so that the desired communication (e.g., advertisement) is sent to the targeted individual(s) in accordance with the applicable parameters.

VLC bulbs 160A-B are representative of the communications hubs that may be directed at a particular section of the venue. As illustrated in FIG. 1A, there may be multiple communications hubs distributed within an event venue, depending on the size, layout, and range of the communication hubs. Such information regarding the hubs may be stored in section database 145 for use in determining which communication hub to use in sending out particular communications.

Channel selector and data 165 may manage information exchanged with multiple third parties. For example, channel selector and data 165 may assign a particular channel to a particular third party (e.g., advertiser, announcer). As such, information coming in and being pushed out with respect to a particular third party may be associated with a designated channel.

Third party GUI 170 provides an interface by which each third party can enter and review messages and other communications being sent out to designated audiences. For example, an announcer may user third party GUI to select individuals in box seats to receive certain announcements.

Third parties may include stadium operator 175A and announcers 175B (both in-stadium and out-of-stadium) may communicate with stadium VLC system 125 by direct connection (e.g., as does stadium operator 175A) or via the cloud (e.g., as do announcers 175B).

Third party network server 180 may include any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server. Third party network server 180 may be used to store information regarding a plurality of third parties, such as announcers, advertisers, etc., and to provide such information as needed, to stadium VLC system 125.

Communication network 190 may be a local, proprietary network (e.g., an intranet) and/or may be a part of a larger wide-area network. The communications network 110 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communications network 190 allows for wireless communication between the various device in the network environment of FIG. 1B.

Figure 2:
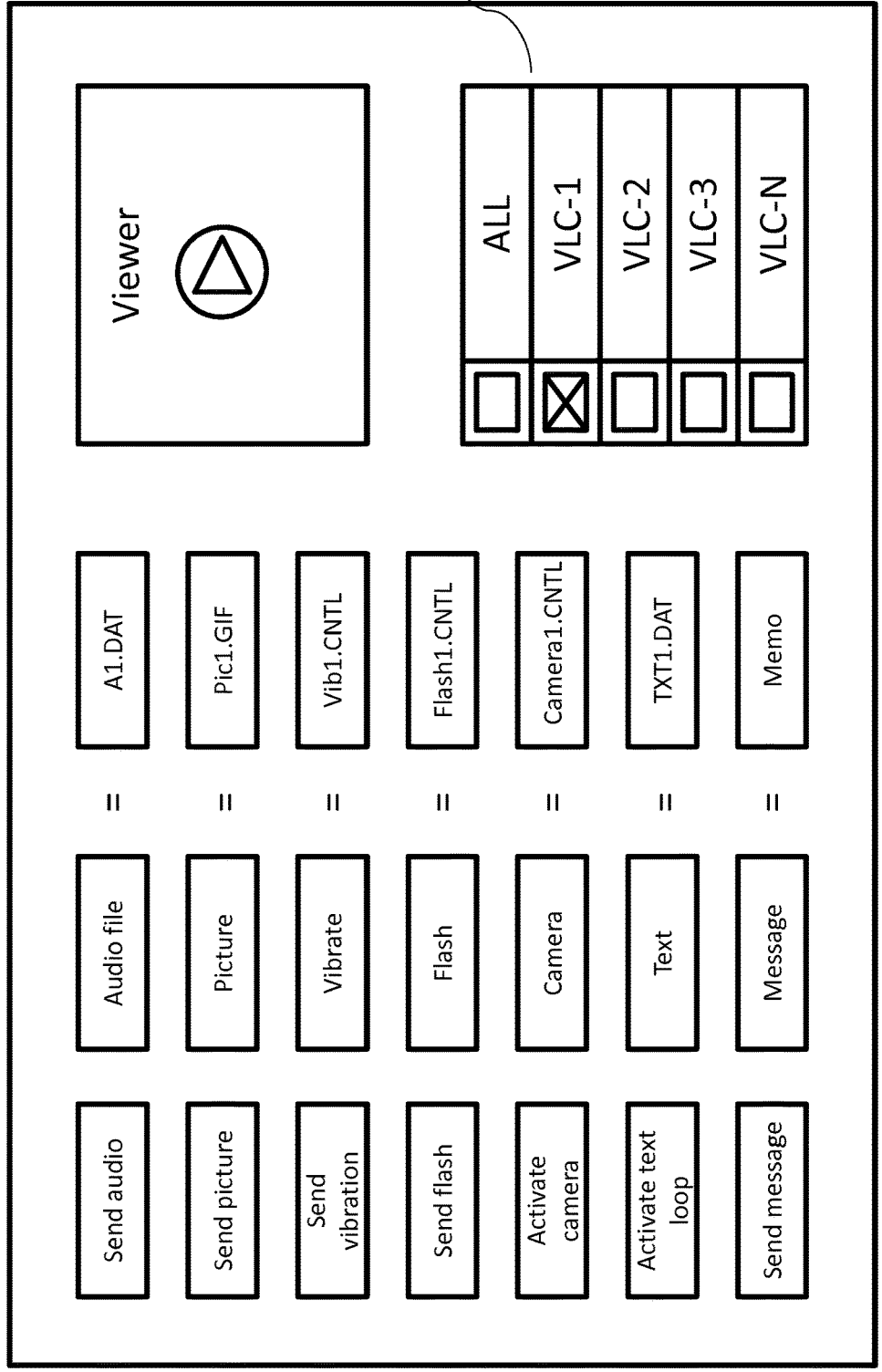
FIG. 2 illustrates an exemplary stadium software graphic user interface (GUI) that may be used in a system for managing third party interactions with venue communications.

FIG. 2 illustrates an exemplary stadium software graphic user interface (GUI) 200 that may be used in a system for managing third party interactions with venue communications. As illustrated, VLC stadium software GUI 200 may include a viewer for viewing video of the event, as well as a menu of communications hubs (e.g., ALL, VLC-1, VLC-2, VLC-3, VLC-N). In addition, the administrator or user of the VLC stadium software 200 may further specify a type of communication to send, including sending audio, pictures, vibration commands, flash command, camera activation commands, text activation command loop, and messages. Each of these types of communications may be associated with the corresponding content (e.g., a particular audio file, picture file, vibration command, flash command, camera activation command, text file, or message/memorandum content). Such commands may be sent individually or in combination.

For example, the send audio command may be used to send the audio file A1.DAT via the selected communication hub (e.g., VLC 1). Likewise, the send picture command may be used to send the loaded picture file PICTURE1.JIF. The send vibration command may be used to send a control file called VIB1.CONTROL, which may be a control file that turns on the vibration motor of a mobile device (e.g., mobile device) in a predefined pattern (e.g., turn on and off for a second, then on and off for a second, and on for fifteen seconds). A flash command may be used to send a control file called FLASH1.CONTROL, which may likewise specify a pattern (e.g., flash for a second, off for a second, flash for a second, off for a second). The camera activation command allows for sending of a camera control file Camera1.CNT1; the text loop activation commands allows for sending of a TXT1.DATA data file, which sends a command control signal through VLC 1 to a mobile device 110. Embedded in the command control signal may be a phone number to text the message to the stadium system 125, which may then send a personalized message. Finally, a send message command may be used to send a memo as entered in the field provided in VLC stadium software GUI 200.

FIG. 3A illustrates an exemplary software application profile 300 that may be used in a system for managing third party interactions with venue communications. VLC software application profile 300 may include options for allowing commands or controls to be executed on the mobile device 110. Such options may include allowing speaker control, display control, vibrate control, flash control, camera control, auto text send control, message control, and other.

FIG. 3B illustrates an exemplary data structure 310 that may be used in a system for managing third party interactions with venue communications. As illustrated, the VLC data structure 310 may include portions for a start code sequence, control word, data, and end code sequence. Such a VLC data structure 310 may be parsed by various devices (e.g., illustrated in FIG. 1B) communicating commands related to the communications hub system.

FIG. 3C is a flowchart illustrating an exemplary software application 120 method that may be executed in a system for managing third party interactions with venue communications. The method of FIG. 3C (as well as the other methods described herein) may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 3C and the other methods illustrated and described herein (and the order thereof) are exemplary and may include various alternatives, equivalents, or derivations thereof including but not limited to the order of execution of the same.

In step 320, VLC information is received. Such information may be structured in accordance with the data structure 310 of FIG. 3B. In step 325, the control word may be parsed out. If the control word is determined to equal speaker in step 330, the data may be sent to the speaker of mobile device 110, if the profile 300 is enabled. If the control word is determined to equal display in step 335, the data may be sent to the display of mobile device 110, if the profile 300 is so enabled. If the control word is determined to equal vibrate in step 340, then data may be sent to the vibration motor of mobile device 110, if the profile 300 is so enabled; if the control word is determined to equal flash in step 345, then the command data may be sent to the flash of mobile device 110, if the profile 300 is so enabled; if the control word is determined to equal camera in step 350, the data may be sent to the camera of mobile device 110, if the profile is so enabled. If the control word is determined to equal text in step 355, the text may be sent to the text message module of mobile device 110 (e.g., 818-717-1000), if the profile is so enabled; and if the control word is determined to equal message in step 360, the message may be displayed at mobile device 110, if the profile is so enabled. In step 365, the mobile device 110 may wait until the next VLC data communication, at which point the method may return to step 320.

Figure 4:
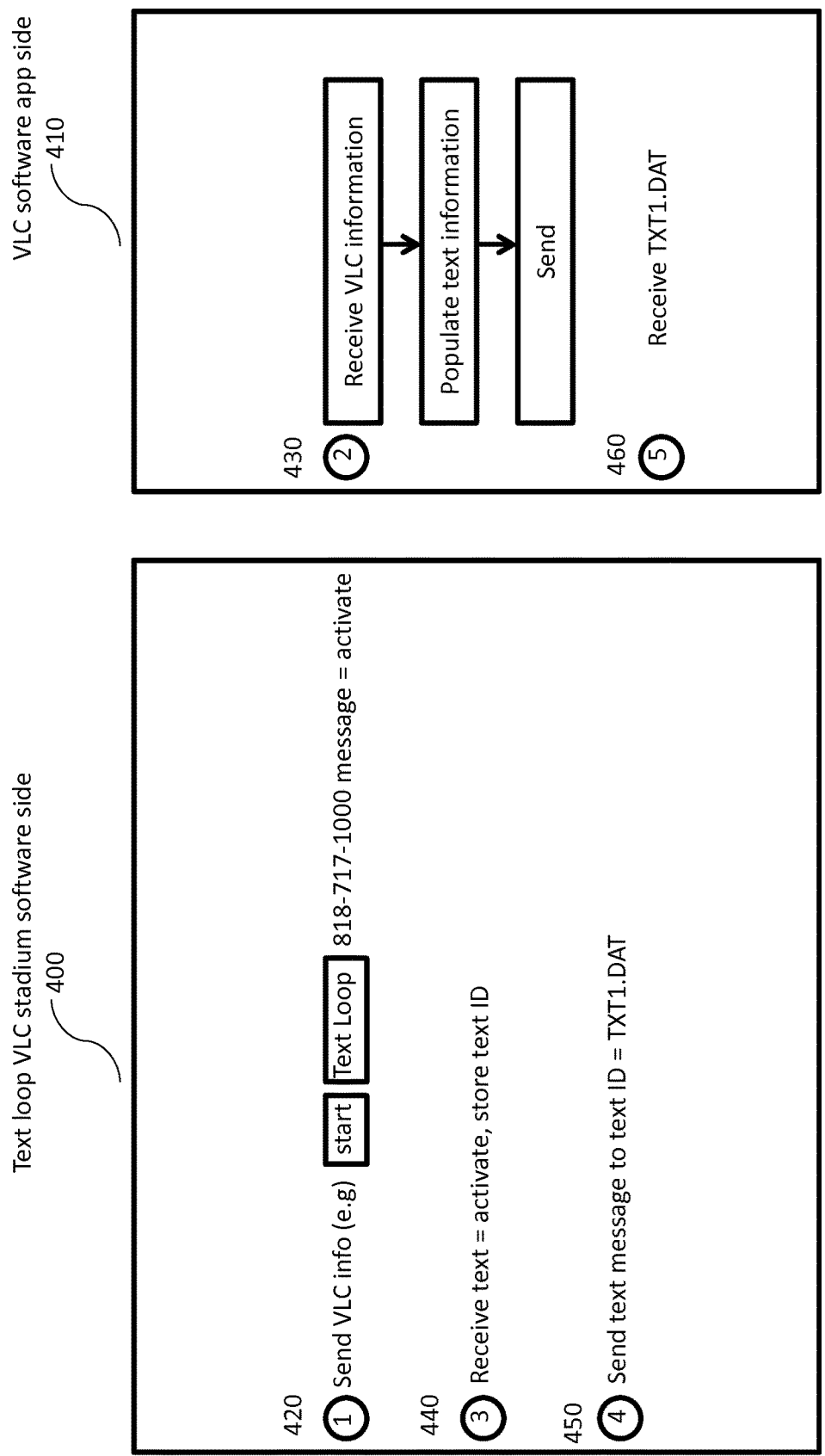
FIG. 4 is a flowchart illustrating an exemplary stadium software and software application method that may be executed in a system for managing third party interactions with venue communications.

FIG. 4 is a flowchart illustrating an exemplary text loop stadium software 400 and software application 410 method that may be executed in a system for managing third party interactions with venue communications. In step 420, the VLC information (e.g., "start text loop" command string, 818-717-1000, and the message=activate) may be sent from the text loop VLC stadium software 400 to VLC software application 410 (e.g., on mobile device 110). In step 430, the VLC software application 410 may receive the VLC information, populate the text information, and then send the text (which goes back to 818-717-1000, which is the stadium owner).

In step 440, the stadium owner (by way of the text loop VLC stadium software 400) may receive the text=activate and stores the text ID of the mobile device 110. In step 450, a text message (e.g., TXT1.DAT) may be sent to the mobile device associated with the text ID. In step 460, the VLC software application 410 of the mobile device 110 may receive the TEXT1.DAT file. In this way, an individual mobile device 110 may be directly connected to the system by zone, so that stadium system 125 can communicate with event attendees one-on-one.

Figure 5:
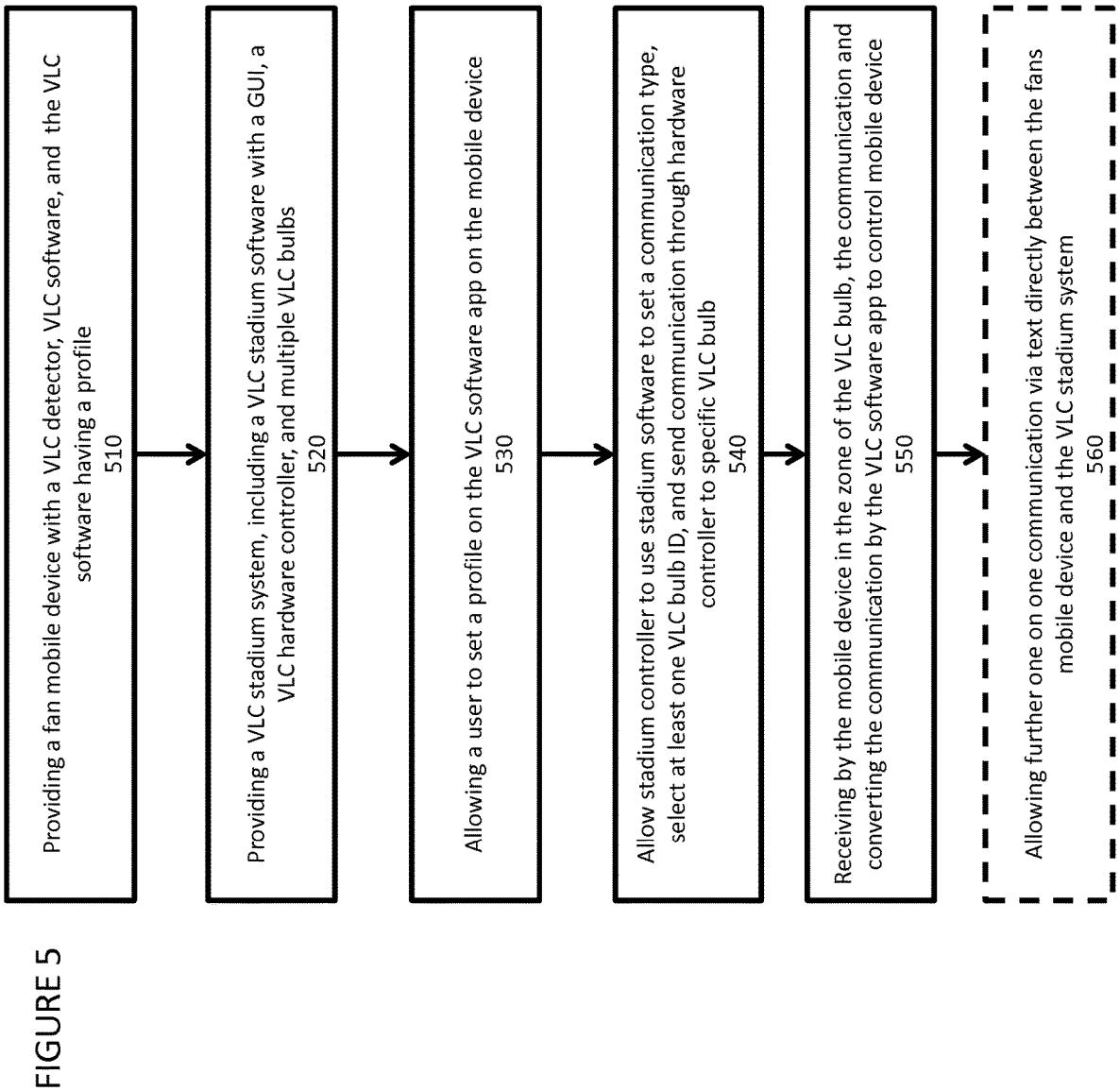
FIG. 5 is a flowchart illustrating an exemplary attendee interactive method that may be executed in a system for managing third party interactions with venue communications.

FIG. 5 is a flowchart illustrating an exemplary attendee interactive method that may be executed in a system for managing third party interactions with venue communications. In step 510, a mobile device (e.g., mobile device 110) may be provided with VLC software application 115 and a VLC detector 120 (or other wireless communication interface), as well as a VLC software profile 300. In step 520, a VLC stadium system 125 may be provided with a VLC hardware controller 155, multiple VLC bulbs 160A-B, and a GUI 170. In step 530, a user may set a profile 300 on the VLC software application 115 on the mobile device 110. In step 540, a stadium controller may send operation commands to the VLC stadium system 125, which may include selecting at least one communication type (e.g., text message), selecting at least one VLC bulb ID (e.g., of VLC bulb 160A), and sending the communications through the VLC hardware controller 155 to that specific VLC bulb 160A. In step 550, the mobile device 110 located in the section associated with VLC bulb 160A may receive and parse the communication to identify a command that is executable by the mobile device 110. In step 560, further one-on-one communications may be allowed to be conducted via text directly between the mobile device 110 and the VLC stadium system 125.

FIG. 6 illustrates an exemplary advertising system 600 that may be used in a system for managing third party interactions with venue communications. Advertisers API 610 may be one of the third party APIs of stadium system 125. Advertisers API 610 may include information such as game date, sections to advertise, advertisement content, and time of advertisement, as well as an option to save such information as entered by a particular advertiser to a database (e.g., advertisers database 620, which may be part of third party database 140). As illustrated, an advertiser may specify a particular game date on which to advertise (e.g., May 20, 2014), which sections of the event venue to target (e.g., all sections, section 100, section 101, etc.), specific coupons or offers (e.g., a coupon for 20% off a coke along with an associated barcode), and a time of advertisement (e.g., 1:00 PM to 1:15 PM).

Advertisers database 620 may store such information as entered in the advertisers API 610, thereby allowing advertisers to set their campaigns ahead of time. Such information may subsequently be loaded at the specified date and time and used to send the specified advertising to the specified sections.

VLC software 630 may be executed to determine a time input or check the time in step 635. The advertisers database 620 may be searched for a time window match in step 640. Once the match is found, the advertising file (e.g., A2.DAT) may be loaded in step 645. In step 650, the loaded advertising file may be converted to VLC data. In step 660, information regarding the targeted section(s) may also be loaded, and in step 665, the VLC bulbs 160A-B may be matched to the sections query by querying the sections database 145.

In step 670, the VLC data may be sent to the identified VLC bulbs 160A-B via the VLC hardware controller 155. In step 675, it may be determined whether there may be a next record in the time window. If yes, the method may return to step 640 with respect to the next record in the advertising database 620. If no, the method may return to step 635 where the time may be checked again.

Figure 7:
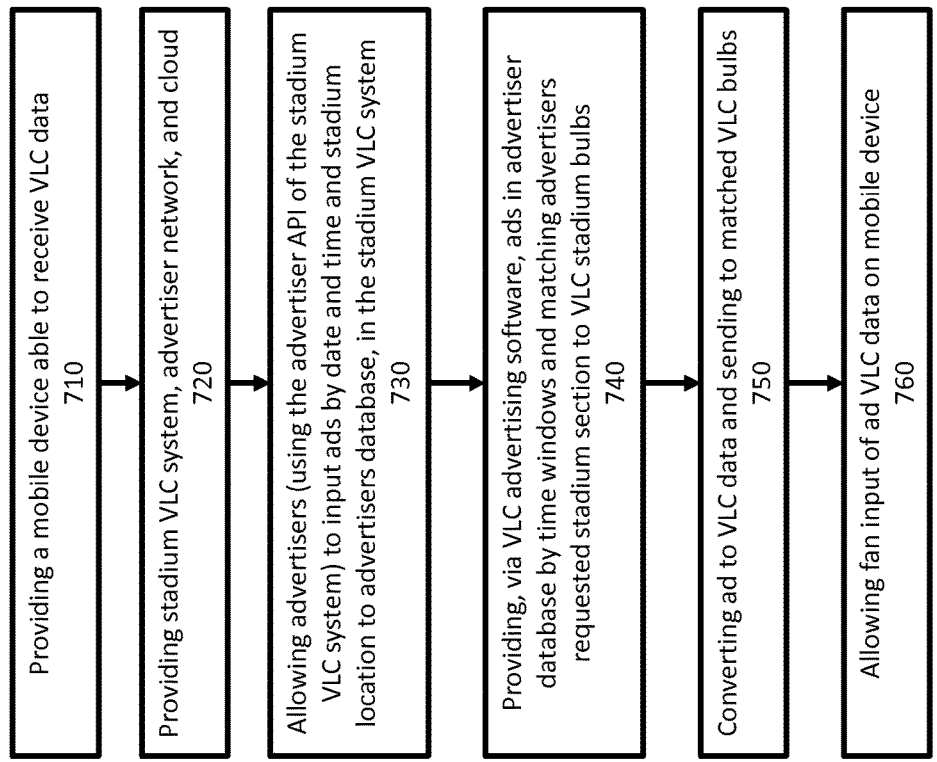
FIG. 7 is a flowchart illustrating an exemplary advertising method that may be used in a system for managing third party interactions with venue communications.

FIG. 7 is a flowchart illustrating an exemplary advertising method 700 that may be used in a system for managing third party interactions with venue communications. In step 710, a mobile device is provided with the ability to receive VLC communications (or communications associated with another wireless protocol). In step 720, the stadium system 125 may be provided with access to a third party network 180 (e.g., advertisers network) via the cloud 190.

In step 730, advertisers may use advertising software API 610 to provide ads to advertiser database 620 by time windows, as well as to specify targeted section(s) associated with certain communication hubs (e.g., VLC bulbs 160A-B. In step 740, an advertisement may be converted to VLC data and sent to the communication hub (e.g., VLC bulb 160A) bulb associated with the targeted section. In step 760, a mobile device 110 may be allowed to receive input of the VLC advertisement data.

Figure 8:
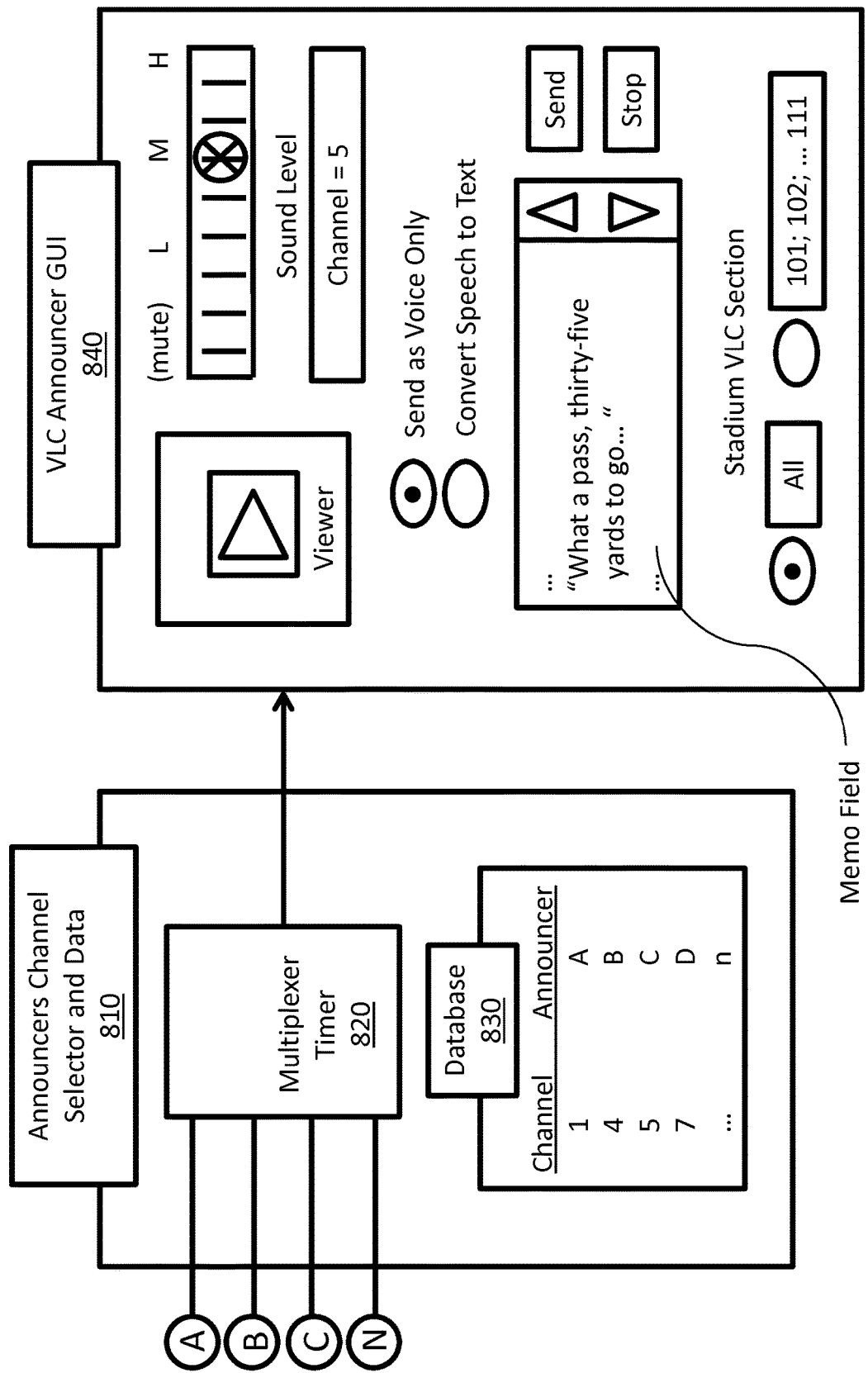
FIG. 8 illustrates an exemplary announcers system that may be used in a system for managing third party interactions with venue communications.

FIG. 8 illustrates an exemplary announcers system that may be used in a system for managing third party interactions with venue communications. Such an announcers system may include an announcers channel selector and data 810 (which may be part of channel selector and data 165 of FIG. 1B). As illustrated, there may be a plurality of data streams from announcers A, B, C, and N, which may be managed by multiplexer timer 820. Multiplexer timer 820 may pick up data from each of the data streams and assign to a predetermined channel (e.g., one of channels A-N). Database 830 may store the assignments, where channel 1 may be associated with announcer A, channel 4 may be associated with announcer B, channel 5 may be associated with announcer C, and channel 7 may be associated with announcer D.

A real-time stream of all the data may be hard-wired into the VLC announcer GUI software 840, which provides a viewer window related to the event. VLC announcer GUI may further include a sound level controller (e.g., louder or softer), options to send audio announcements as voice-only or convert speech to text, memo field, and stadium VLC section selections. Such a VLC announcer GUI 840 allows the announcer to input announcements, control the volume thereof, select options with respect to voice-only or convert to text, add memos, and specify the sections at which to broadcast.

Figure 9:
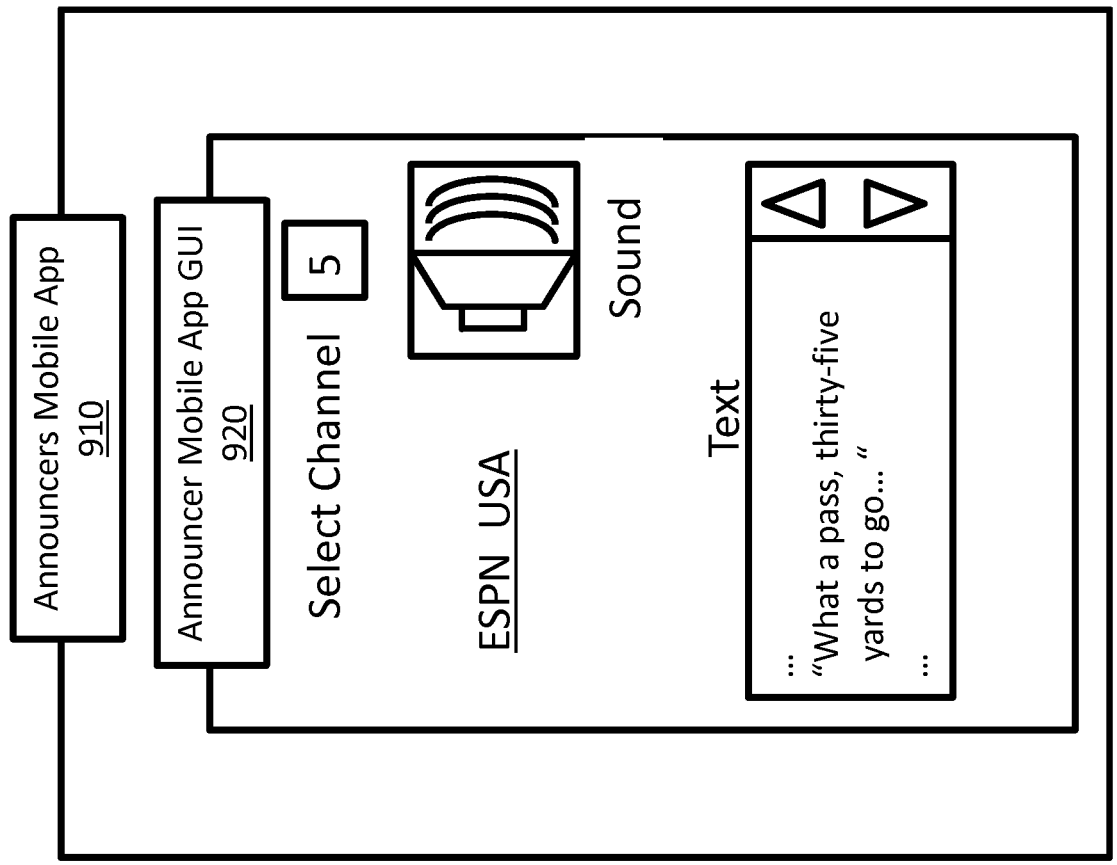
FIG. 9 illustrates an exemplary announcers application that may be used in a system for managing third party interactions with venue communications.

FIG. 9 illustrates an exemplary announcers application 910 that may be used in a system for managing third party interactions with venue communications. Such an announcers application 910 may reside at the mobile device 110 and be executed to display announcer mobile application GUI 920. The announcer mobile application GUI 920 may include a channel selector, information regarding the channel (e.g., name of the channel is ESPN), as well as text commentary or announcements. When executed, the announcer mobile application GUI 920 may also include an option to play an audio recording or stream of the announcements or other communications from the announcer as input via announcer GUI 840 of FIG. 8.

Figure 10:
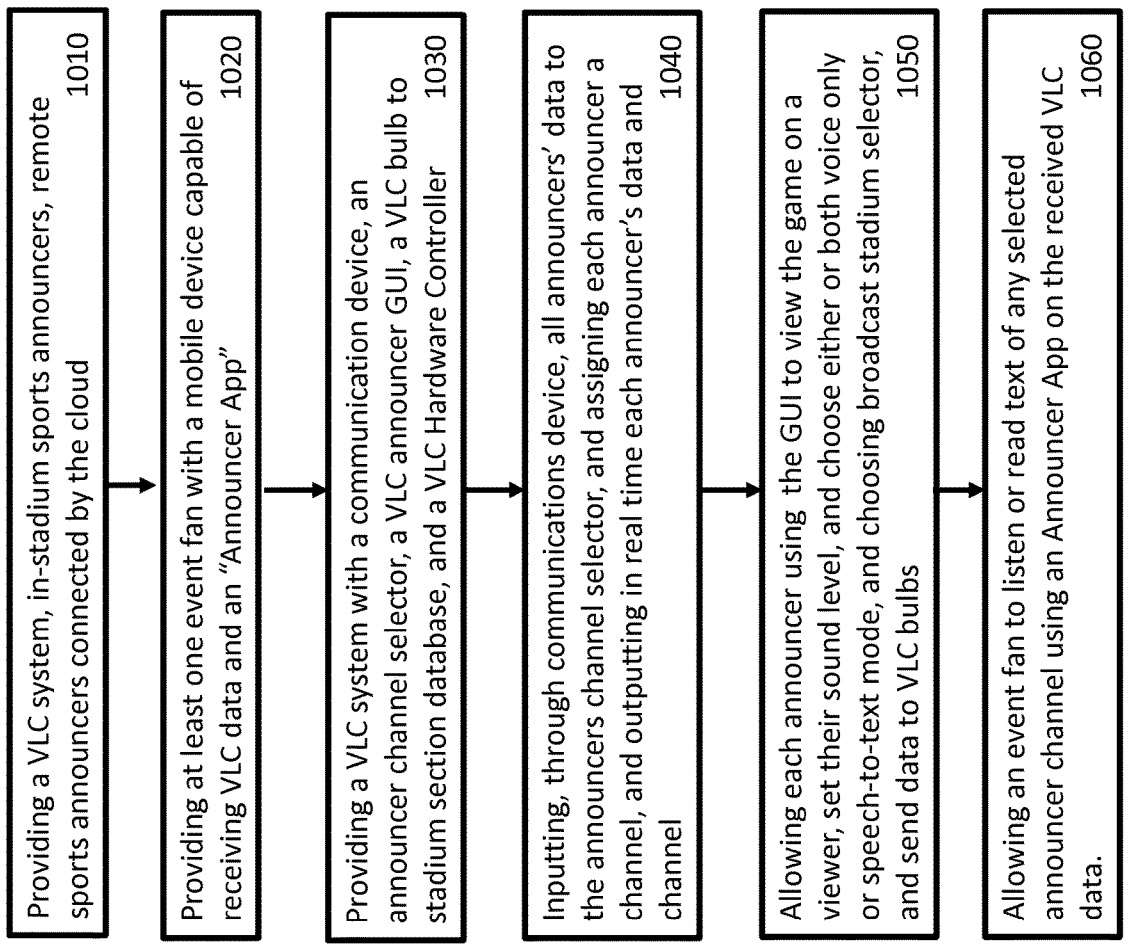
FIG. 10 is a flowchart illustrating an exemplary announcers method that may be executed in a system for managing third party interactions with venue communications.

FIG. 10 is a flowchart illustrating an exemplary announcers method that may be executed in a system for managing third party interactions with venue communications. In step 1010, a VLC stadium system 125 may be provided that may be accessible by announcers 175B (both in-stadium and remotely via the cloud). In step 1020, a mobile device 110 may be provided with the ability to receive wireless communications from the communications hubs of the event venue (e.g., VLC detector 120 for receiving communications from VLC bulbs 160A), as well as an announcers application (e.g., announcers application 910 of FIG. 9).

In step 1030, the stadium system 125 may further be provided with communications interfaces (e.g., communication port 130), announcer channel selector and data 810, VLC announcer GUI 840, VLC hardware controller 155, and multiple VLC bulbs 160A-B distributed and associated with specified sections of the event venue. In step 1040, announcer data may be input to announcer channel selector and data 810, which may assign a channel to each announcer, and output in real-time the announcer data to a mobile device 110 (in a specified section) that has activated its announcers application 910.

In step 1050, each announcer may use the announcers GUI 840 to view the event on a viewer, set a respective sound level, select audio-only or convert-to-text, select certain sections, and send the data to be broadcast via the stadium system 125 (e.g., via hardware controller 155 and communication hubs/VLC bulbs 160A-B). In step 1060, a mobile device 110 may open the announcers application 910, select a channel/announcer, and allow the user to trigger real-time audio play associated with the selected channel/announcer (which may be associated with text).

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A system for managing communications in an event venue, the system comprising:
one or more communications interfaces that receive one or more incoming communications from a third party device, wherein each of the one or more incoming communications has a predefined data structure comprising a control word and corresponding content, wherein the one or more communications interfaces also receive a message from a user device associated with a target and reply to the user device with a personalized message;
a database that stores information regarding the one or more incoming communications, each incoming communication associated with one or more parameters;
a memory that stores instructions; and
a processor that executes the instructions, wherein execution of the instructions by the processor causes the processor to:
determine that the one or more parameters associated with a specified communication from the third party device have been met, wherein the specified communication is one of the one or more incoming communications,
identify the target based on the specified communication, the target located in a section of the event venue,
identify that the section of the event venue is associated with a first wireless communications hub of a plurality of wireless communications hubs distributed within the event venue based on a respective range of each of the plurality of wireless communications hubs, parse the control word from the specified communication into a command, wherein the command concerns text loop activation, provide the command and the corresponding content from the specified communication to the first wireless communications hub in response to identifying the target, and generate the personalized message based on receipt of the message from the user device associated with the target; and the first wireless communications hub, wherein the first wireless communications hub sends at least the command and the corresponding content from the specified communication to the user device associated with the target, wherein the user device sends the message in response to receipt of the command and the corresponding content from the specified communication.

2. The system of claim 1, wherein the corresponding content is an audio file and the command comprises a command to play the audio file, wherein the user device communicates the corresponding content to the target by playing the audio file as specified by the command.

3. The system of claim 1, wherein the corresponding content is a picture and the command comprises a command to display the picture, wherein the user device communicates the corresponding content to the target by displaying the picture as specified by the command.

4. The system of claim 1, wherein the corresponding content identifies a pattern of one or more "on" states and one or more "off" states and the command comprises a command to control a hardware component of the user device according to the pattern, wherein the hardware component comprises at least one of a vibration motor and a flash.

5. The system of claim 1, wherein the corresponding content comprises a message and the command comprises a command to display a message identified within the corresponding content, wherein the user device communicates the corresponding content to the target by displaying the message as specified by the command.

6. The system of claim 1, wherein the corresponding content identifies a phone number corresponding to an event venue system, wherein the user device uses the phone number to send the message, where a text identifier is determined from the message and used to send the personalized message to the user device.

7. The system of claim 1, wherein the command comprises a command to activate a camera of the user device.

8. The system of claim 1, wherein the one or more parameters comprise at least one of a date or a time.

9. The system of claim 1, wherein the one or more parameters identify at least the section of the event venue.

10. A method for managing third party interactions with event venue communications, the method comprising:

receiving one or more incoming communications over a communication network from a third party device, wherein each of the one or more incoming communications has a predefined data structure comprising a control word and corresponding content;

storing information regarding the one or more incoming communications in memory, each incoming communication associated with one or more parameters;

executing instructions stored in memory, wherein execution of the instructions by a processor causes the processor to:

determine that the one or more parameters associated with a specified communication from the third party device have been met, wherein the specified communication is one of the one or more incoming communications, identify a target based on the specified communication, the target located in a section of the event venue, identify that the section of the event venue is associated with a first wireless communications hub of a plurality of wireless communications hubs distributed within the event venue based on a respective range of each of the plurality of wireless communications hubs, and parse the control word from the specified communication into a command, wherein the command concerns text loop activation, provide the command and corresponding content to the first wireless communications hub in response to identifying the target, wherein the first wireless communications hub sends at least the command and the corresponding content from the specified communication to a user device associated with the target, wherein the user device sends a message in response to receipt of the command and the corresponding content from the specified communication, and generate a personalized message based on receipt of the message from the user device associated with the target; and replying to the message by sending the personalized message to the user device.

11. The method of claim 10, wherein the corresponding content is an audio file and the command comprises a command to play the audio file, wherein the user device communicates the corresponding content to the target by playing the audio file as specified by the command.

12. The method of claim 10, wherein the corresponding content is a picture and the command comprises a command to display the picture, wherein the user device communicates the corresponding content to the target by displaying the picture as specified by the command.

13. The method of claim 10, wherein the corresponding content identifies a pattern of one or more "on" states and one or more "off" states and the command comprises a command to control a hardware component of the user device according to the pattern, wherein the hardware component comprises at least one of a vibration motor and a flash.

14. The method of claim 10, corresponding content comprises a message and the command comprises a command to display a message identified within the corresponding content, wherein the user device communicates the corresponding content to the target by displaying the message as specified by the command.

15. The method of claim 10, wherein the corresponding content identifies a phone number corresponding to an event venue system, wherein the user device uses the phone number to send the message, where a text identifier is determined from the message and used to send the personalized message to the user device.

16. The method of claim 10, wherein the command comprises a command to activate a camera of the user device.

17. The method of claim 10, wherein the one or more parameters comprise at least one of a date or a time.

18. The method of claim 10, wherein the one or more parameters identify at least the section of the event venue.

19. A non-transitory computer-readable storage medium, having embodied thereon a program executable by a processor to perform a method for managing third party interactions with event venue communications, the method comprising:

receiving one or more incoming communications over a communication network from a third party device, wherein each of the one or more incoming communications have a predefined data structure comprising a control word and corresponding content;

storing information regarding the one or more incoming communications in memory, each communication associated with one or more parameters;

determining that the one or more parameters associated with a specified communication from the third party device has been met, wherein the specified communication is one of the one or more incoming communications;

identifying a target based on the specified communication, the target located in a section of the event venue;

identifying that the section of the event venue is associated with a first wireless communications hub of a plurality of wireless communications hubs distributed within the event venue based on a respective range of each of the plurality of wireless communications hubs;

parsing the control word from the specified communication into a command, wherein the command concerns text loop activation;

providing the command and corresponding content to the first wireless communications hub in response to identifying the target, wherein the first wireless communications hub sends at least the command and the corresponding content from the specified communication to a user device associated with the target, wherein the user device sends a message in response to receipt of the command and the corresponding content from the specified communication;

receiving the message from the user device;

generating a personalized message based on receipt of the message from the user device; and replying to the message by sending the personalized message to the user device.

\* \* \* \* \*